No 849,966. PATENTED APR. 9, 1907.
G. W. BLANK.
LUBRICATOR.
APPLICATION FILED JAN. 15, 1907.
4 SHEETS—SHEET 4.
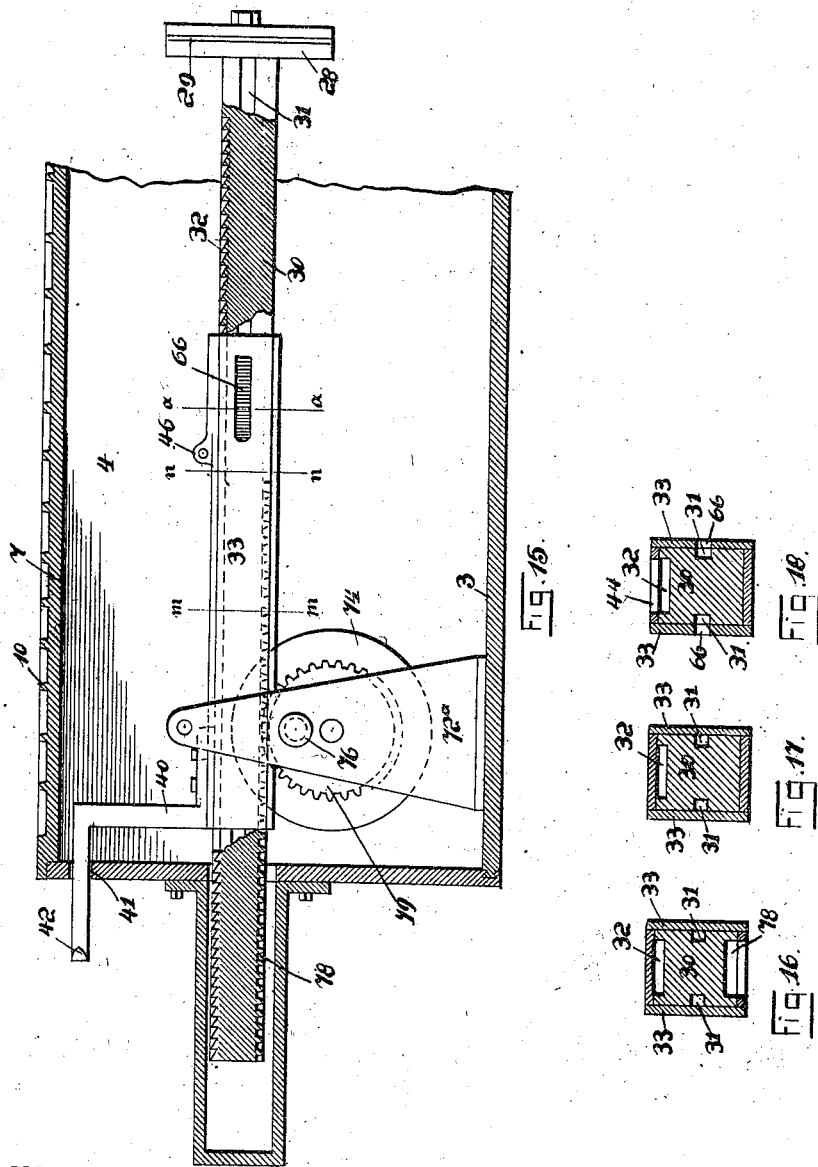

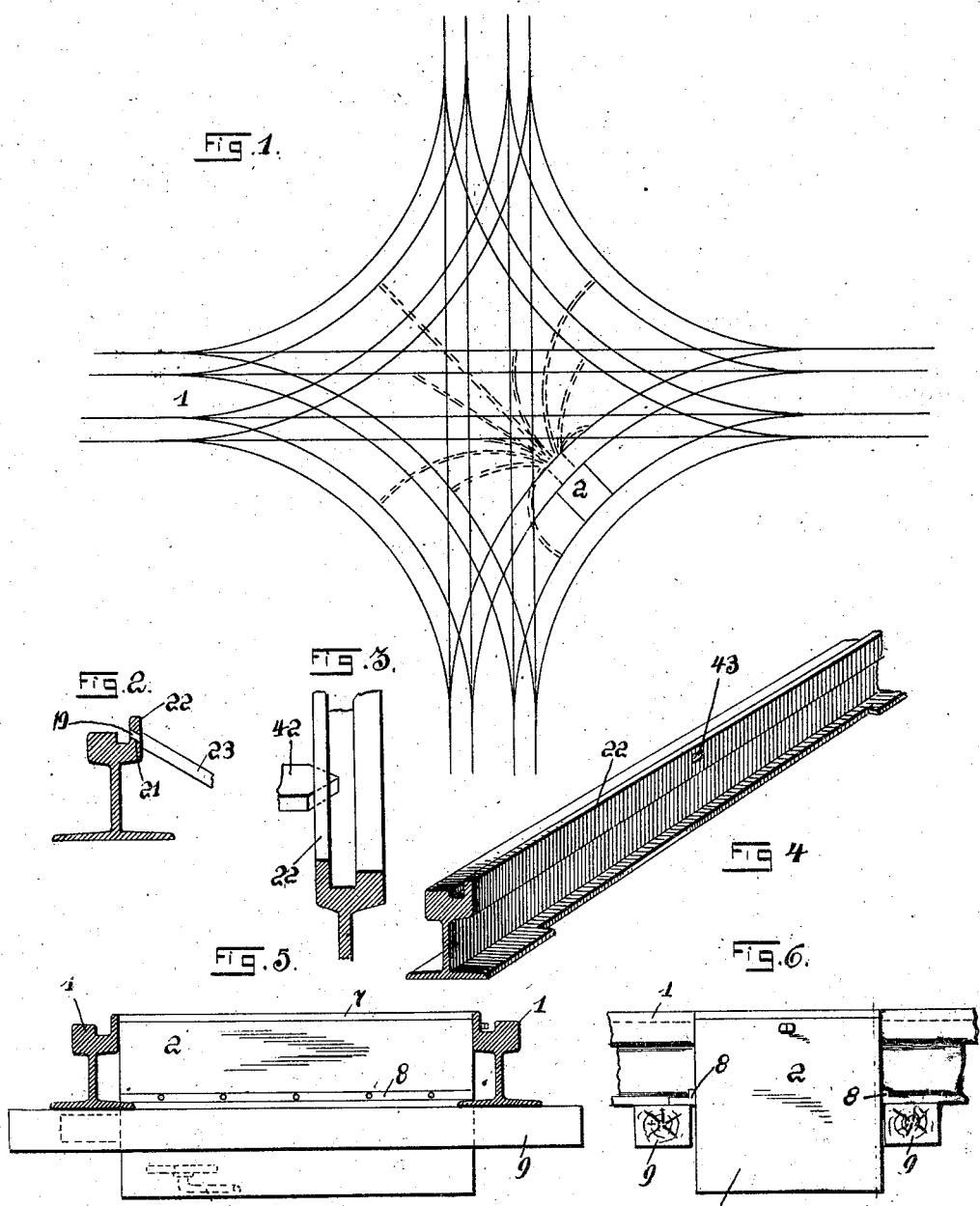

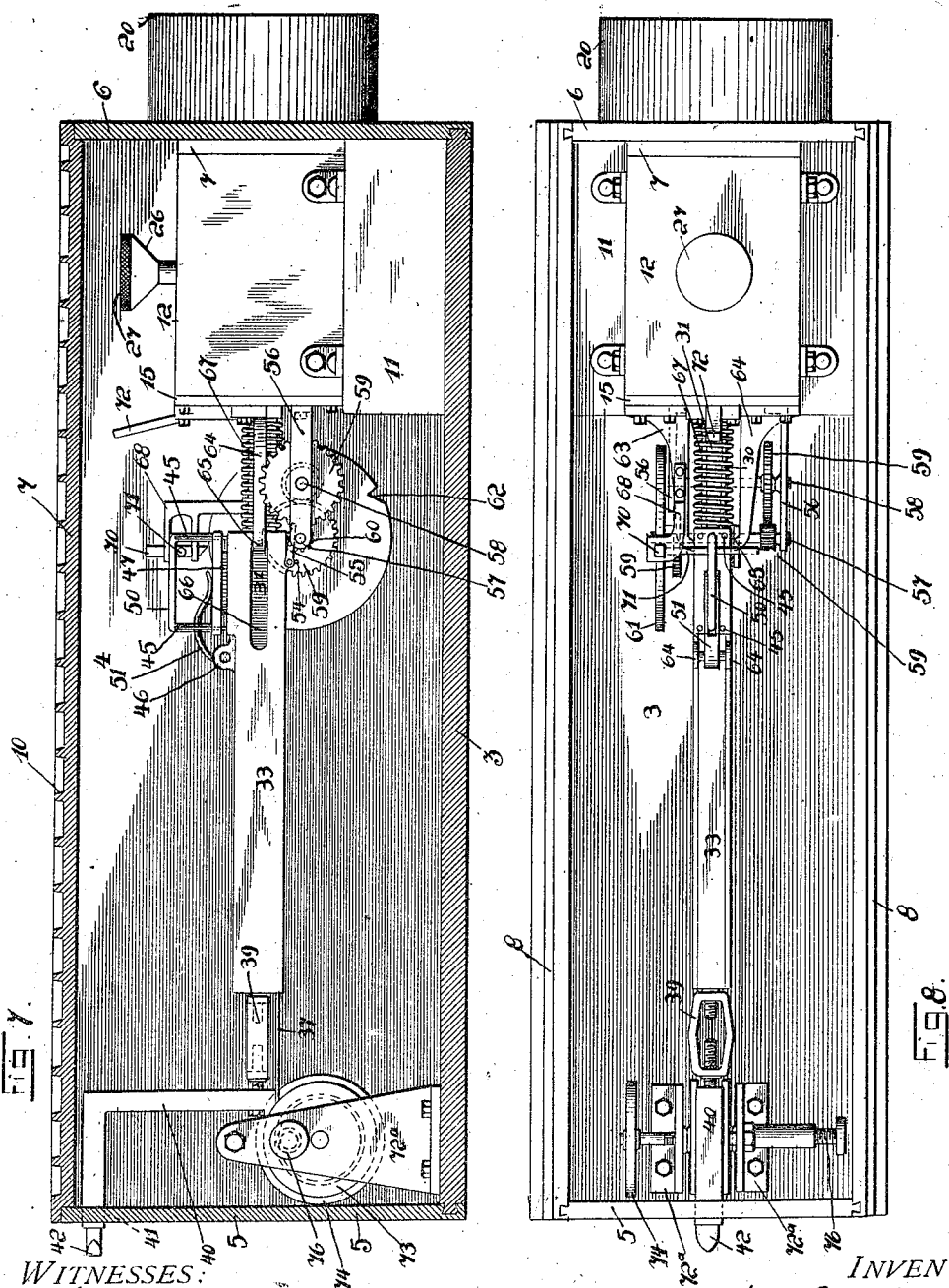

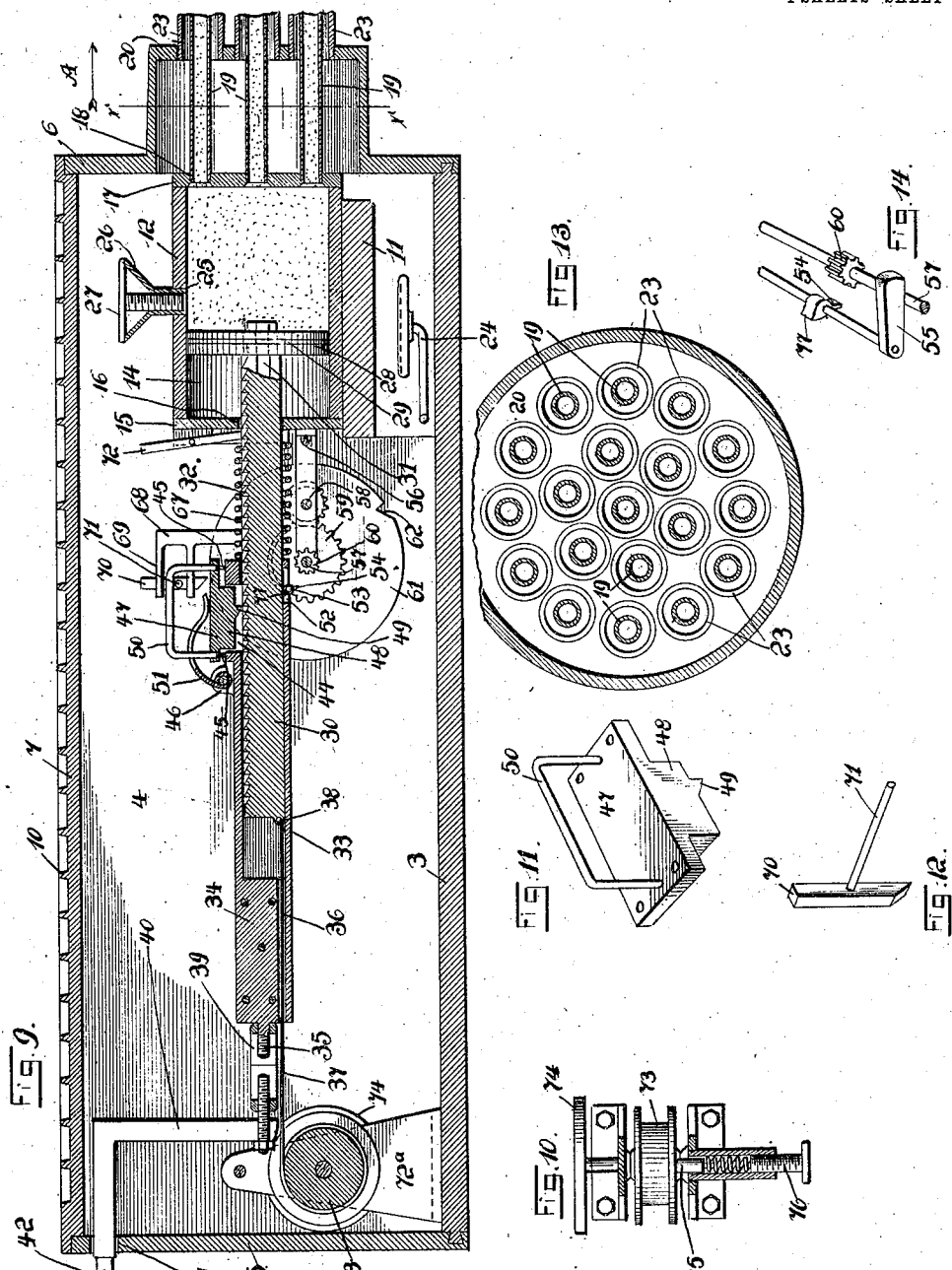

UNITED STATES PATENT OFFICE.

GEORGE W. BLANK, OF WILKINSBURG, PENNSYLVANIA.

LUBRICATOR.

No. 849,966.　　　　Specification of Letters Patent.　　　Patented April 9, 1907.

Application filed January 15, 1907. Serial No. 352,341.

*To all whom it may concern:*

Be it known that I, GEORGE W. BLANK, a citizen of the United States of America, residing at Wilkinsburg, in the county of Allegheny and State of Pennsylvania, have invented certain new and useful Improvements in Lubricators, of which the following is a specification, reference being had therein to the accompanying drawings.

This invention relates to lubricators; and the invention has for its object to provide an automatically-operated lubricator for the curved tracks of street-railway systems.

My invention aims to provide a novel form of lubricator for automatically oiling or greasing the rails of curved tracks, and in this connection my invention is particularly designed for street-railway systems, where the curved tracks have heretofore been manually lubricated, thus incurring considerable labor and expense. To this end my invention involves positive and reliable means for effecting at predetermined times a perfect lubrication of the guard-flanges of curved rails and in this manner produces a considerable saving of wear and tear upon the rolling-stock of street-railway systems.

The invention embodies a novel form of combined lubricant-reservoir and lubricant-discharging means, together with novel means for distributing the lubricant at intermediate points upon the curved tracks of railways. In connection with the discharging means I have devised a novel actuated mechanism and timing mechanism which is easily and quickly operated to distribute a quantity of lubricant at predetermined times.

An important feature of my invention resides in providing a central lubricant-distributing station for simultaneously lubricating a plurality of intersecting tracks irrespective of atmospheric conditions.

Another feature of my invention resides in the manner in which the lubricator is automatically operated, so that after being properly set it requires no attention whatever on the part of a car operator or attendant except when the lubricant within the reservoir has become exhausted.

With these and other objects in view, which will more readily appear as the invention is better understood, the same consists in the novel construction, combination, and arrangement of parts to be hereinafter more fully described and then specifically pointed out in the appended claims.

Referring to the drawings forming part of this specification, like numerals of reference designate corresponding parts throughout the several views, in which—

Figure 1 is a diagrammatic view of a plurality of intersecting tracks, representing the various curves used by railway system at the intersection of from four to eight street-car lines. Fig. 2 is a cross-sectional view of a rail, illustrating a tube connection therewith. Fig. 3 is a fragmentary perspective view of a rail, illustrating the actuating point or projection of my improved lubricator. Fig. 4 is a perspective view of a portion of a rail constructed to accommodate the actuating-point or projection of the lubricator. Fig. 5 is a cross-sectional view of a railway-track equipped with a lubricator. Fig. 6 is an end view of the lubricator as supported between two ties or sleepers. Fig. 7 is a longitudinal sectional view of a lubricator-casing, illustrating the interior mechanism thereof in elevation. Fig. 8 is a plan of the lubricator-casing, illustrating the mechanism thereof in plan. Fig. 9 is a longitudinal sectional view of the lubricator. Fig. 10 is a plan, partly in section, of a locking mechanism comprising a part of the lubricator. Fig. 11 is a perspective view of a gripping-block forming part of the lubricator. Fig. 12 is a perspective view of the gripping-block-actuating dog. Fig. 13 is a cross-sectional view taken on the line *x x* of Fig. 9 looking in the direction of the arrow A of said figure. Fig. 14 is a perspective view of the plunger-actuating dog of my improved lubricator. Fig. 15 is a longitudinal sectional view of a portion of a lubricator, illustrating a modified form of construction. Fig. 16 is a cross-sectional view taken on the line *m m* of Fig. 15. Fig. 17 is a similar view taken on the line *n n* of Fig. 15. Fig. 18 is a similar view taken on the line *a a* of Fig. 15.

In the accompanying drawings I have illustrated the intersection of a plurality of tracks comprising rails 1, (see Figs. 1 to 6, inclusive;) and between two of said tracks I have located my improved lubricator, the lubricator being so placed that a lubricant can be easily distributed to the curved rails of the intersecting tracks. The lubricator comprises a rectangular casing 2, having a base 3, side walls 4, end walls 5 and 6, and a top plate or cover 7. The side walls 4 are provided with longitudinally-disposed cleats 8, whereby the lubricator-casing can be supported between two ties or sleepers 9 and between the innermost rails 1 of two tracks. The top plate 7 of the casing is roughened or corrugated, as at 10, to prevent animals and persons from slipping upon the same.

In one end of the lubricator-casing and upon the base 3 is mounted a bracket 11, and upon said bracket is secured a lubricant-reservoir comprising a rectangular shell 12, having a cylindrical chamber 14. One end of the shell 12 is provided with a detachable head 15, having a central opening 16, while the opposite end of the shell 12 is provided with a head 17, having a plurality of openings 18 formed therein. In each of the openings 18 is mounted a grease or oil conveying tube 19, which extends through a hood 20, carried by the end wall 6. The oil or grease conveying tubes 19 branch out to the curved rails of the street-railway tracks, said tubes entering openings 21, formed in the guard-flanges 22 of the rails 1. (See Fig. 2.) The tubes 19 are incased within tubes 23 of a greater diameter, said tubes 23 communicating with the interior of the hood 20 and incasing the tubes 19 as far as the guard-flanges 22 of the rails. The tubes 23 are employed for protecting the tubes 19 from frost, ice, and cold air or ground that would have a tendency to freeze and coagulate the contents of the tubes 19. To maintain the contents of the tubes 19 in a fluent condition, I use a suitable heating medium 24, as a gas-burner or lamp, which is located in close proximity to the shell or reservoir 12 and the hood 20. The top of the shell or reservoir is provided with an opening 25, in which is mounted an interiorly-screw-threaded funnel 26, which is normally closed by a screw 27.

In the chamber 14 of the shell or reservoir 12 is slidably mounted a plunger-head 28, having suitable packing-rings 29. The head 28 carries a rearwardly-extending plunger 30, which extends through the opening 16 of the shell-head 15. The plunger is substantially rectangular in cross-section and upon its sides is provided with guideways 31, while its upper edge is provided with teeth 32. Sliding over the plunger 30 is a casing 33, having a solid end 34, provided with a threaded stem 35. The solid end 34 is provided with a longitudinally-disposed opening 36 to receive a cable 37, attached at its inner end to the end of the plunger 30, as at 38.

The threaded stem 35 of the casing 33 is connected by a turnbuckle 39 to an angular actuating-arm 40, which extends through an opening 41, formed in the end wall 5 of the lubricator-casing, and is provided with an actuating point or projection 42. This point or projection is adapted to extend through a slot 43, formed in the guard-flange 22 of a rail, (see Fig. 4,) whereby the flange of a car-wheel will engage the point or projection and actuate the arm 40 to move the casing 33 of the mechanism of the lubricator.

The casing 33 adjacent its forward, or end adjacent the lubricant reservoir, is provided in the upper face with an opening 44. Carried by said casing adjacent to said opening are guide-pins 45 and pierced lugs 46. Slidably mounted upon the guide-pins 45 is a gripping-block 47, said block having a depending portion 48 fitting within the opening 44 of the casing 33, and said depending portion is provided with a transverse tooth 49 to engage the teeth 32 of the plunger 30 at predetermined times. The gripping-block is also provided with an upwardly-extending yoke 50, this yoke being employed to support the gripping-block in an inoperative position. To reinforce the action of gravity in carrying the gripping-block into engagement with the plunger 30, I employ a spring 51, said spring being mounted between the pierced lugs 46 and bearing upon the upper surface of the gripping-block. The casing 33 is also provided adjacent its forward end, in its underneath face, with an opening 52, and movably mounted transversely of said opening is a shaft 53, carrying a pawl 54 and a crank-arm 55, (see Fig. 14,) the object of which will presently appear. The shaft 53 has a partial rotation during the operation, as will afterward appear.

The head 15 of the reservoir or shell 12 is provided with rearwardly-extending brackets 56, and in said brackets are journaled shafts 57 and 58. Upon said shafts are mounted meshing spur-wheels 59, a spur-wheel 60, and a timing-wheel 61, the latter having its periphery notched, as at 62. The shafts 57 and 58 are rotated through the medium of the spur-wheel 60, which is actuated by the pawl 54. The head 15 of the shell or reservoir 12 is provided with two rearwardly-extending frames 63 and 64, these frames being provided with hook-shaped ends 65 to engage in slots 66, formed in the sides of the casing 33. The hook-shaped ends 65 of the frames 63 and 64 are employed to limit the movement of the casing 33, and in order that said casing may be normally held in a retracted position I interpose a coiled spring 67 between the casing 33 and the head 15 of the reservoir or shell 12. Upon the frame 63 is mounted a bracket 68, having parallel arms 69, in which is mounted a vertically-moving dog 70. The dog 70 is provided with an outwardly-extending pin 71, adapted to engage in the yoke 50 and normally holds said yoke in an elevated position. The end of the dog 70 contacts with the periphery of the time-wheel 61, which is only moved when said dog recedes into the notch 62 of said wheel. The head 15 of the reservoir or shell 12 is also provided with a plunger-brake mechanism consisting of a pivoted lever 72, which bears upon the upper surface of the plunger and prevents a rearward movement of the plunger after the same has been moved forward to force the lubricant contained within the lubricant-chamber 14 of the shell into the tubes 19. Since said lever is pivoted, it will rock or swing on its pivot and the lower end thereof will be carried forward with the plunger until it passes the tooth on which it was resting and as it passes out of engagement with said tooth will swing back to a substantially vertical position in back of said tooth and lock the flange against rearward movement.

The cable 37, heretofore referred to, for moving the plunger 30 rearwardly from the lubricant-reservoir is used in connection with a drum 73, journaled between two bearings 72ª, mounted upon the base 1 of the lubricator-casing adjacent to the end plate 5. The drum 73 is revolved through the medium of a hand-wheel 74, and the movement of said drum is controlled by a spring-held pin 75, the tension of which is regulated by a thumb-screw 76.

Operation: When it is desired to place my improved lubricator in operation, the attendant of the lubricator removes the lid or cover 10 of the lubricator-casing and removes the screw 27 from the funnel 26 of the reservoir or shell 12. The attendant then relieves the tension of the spring-held pin 75 and revolves the hand-wheel 74 to wind the cable 37 upon the drum 73 and move the plunger 30 and piston-head 28 to the rear end of the lubricant-chamber 14. The reservoir or shell 12 can then be filled with the oil or grease used as a lubricant for street-car tracks. The distribution of the lubricant through the tubes 19 is regulated and controlled entirely by the time-wheel 61, and the operation or forward movement of the plunger 30 entirely depends on the number of notches formed in the periphery of the time-wheel. In the present instance I have illustrated one notch which is adapted to release the gripping-block 47 at each revolution of the time-wheel; but it is obvious that the time-wheel may be provided with a plurality of notches, whereby if the traffic is heavy upon a certain curved track the same can be more frequently lubricated. Assuming that cars are traveling over the tracks illustrated in Fig. 1 of the drawings, the flange of each car-wheel as said wheels ride upon one of the rails will move the actuating point or projection 42 of the actuating-arm 40 and force said point or projection inwardly until the casing 33 has been moved forwardly or toward the lubricant-reservoir a certain distance and placed the spring 67 under tension. The forward movement of the casing 33 causes the pawl 54 to engage the spur-wheel 60 and partially rotate said wheel. The same motion imparted to the wheel 60 is imparted to the time-wheel 61 through the medium of the shafts 57 and 58 and spur-wheels 59. After the pawl 54 has actuated the wheel 60 the crank-arm 55 returns the pawl to its normal position, caused by said arm 55 riding back on shaft 57—that is, with the upper end 77 of said pawl engaging the underneath surface of the plunger 30. The actuating-point 42 is moved quite a number of times before the time-wheel 61 has completed one revolution to place the notch 62 of said wheel in close proximity to the dog 70. Immediately upon the notch 62 reaching the dog 70 the dog descends by gravity and allows the spring-pressed gripping-block 47 to drop into engagement with the teeth 32 of the plunger 30. As the depending portion of said gripping-block engages in the opening 44 of the casing 33 the next movement of the actuating point or projection 42 by the flange of a car-wheel will cause the casing 33 to move the gripping-block 47 forward, and as the tooth 49 of said block engages the teeth of the plunger 30 said plunger and its head will be moved forward and force a certain quantity of lubricant into the tubes 19, it being obvious that after the tubes have once been filled with the lubricant that said lubricant will be forced from the opposite end of the tubes onto the guard-flange 22 of a rail. Immediately upon the flange of a wheel releasing the actuating point or projection 42 the spring 67, which has been placed under tension will return the casing 33 to its normal position, and as the casing recedes the gripping-block is also carried rearwardly, and upon the point or projection 42 again being actuated the time-wheel 61 will elevate the dog 70 and the gripping-block 47. This is accomplished through the beveled surface of the notch 62 engaging the beveled end of the dog 70. The gripping-block 47 and the plunger 30 remain inactive until the time-wheel has again completed a revolution, at which time the plunger 30 is moved forward and ejects a certain quantity of lubricant from the lubricant-chamber 14. The attendant of the lubricator can readily determine by the number of cars passing over the track and the number of notches in the time-wheel 61 approximately when the lubricant chamber 14 has been emptied and can readily refill the same. This is accomplished by removing the lid or cover 10, the screw 27, and returning the plunger 30 to its normal position, as heretofore stated.

In Figs. 15 to 18, inclusive, I have illustrated a slight modification wherein the cable 37 and drum 73 are dispensed with. In lieu of these elements I provide the underneath face of the plunger 30 with teeth or a rack 78, and meshing with said teeth or rack is a pinion 79, journaled between the bearings 72ª and actuated by the hand-wheel 74. In this modified form of construction it will of course be understood that the plunger 30 is made of a sufficient length to allow for its movement, the length being approximately the same as the plunger and cable illustrated in Fig. 9 of the drawings.

From the foregoing description, taken in connection with the drawings, it will be observed that I have devised a novel automatically-actuated lubricator which with little or no expense can be installed upon the present systems of street-railways. In connection with the lubricator I do not care to confine myself to the heating medium used for maintaining the lubricant in a fluent condition or to the minor details of construction entering into my invention. Such other changes as are permissible by the appended claims may be resorted to without departing from the spirit and scope of the invention.

What I claim, and desire to secure by Letters Patent, is—

1. In a lubricator, the combination with curved tracks, of a lubricator-casing mounted between said tracks, a reservoir carried within said casing, a plurality of tubes connecting said reservoir with the rails of said tracks, protecting-tubes surrounding the first-mentioned tubes, a plunger-head mounted within said reservoir for forcing the contents thereof into the first-mentioned tubes, a toothed plunger carried by said head, a reciprocatory casing mounted upon said plunger, an actuating-arm connected to the end of said plunger and protruding outside of said casing and into one of the rails of said tracks, a gripping-block movably mounted in said casing and normally supported above said plunger, a timing mechanism actuated by said casing and adapted to relieve said gripping-block to move said plunger, means located in said casing for moving said plunger rearwardly, means located within said casing for heating the contents of said reservoir and said tubes, and means whereby easy access may be had to said reservoir-casing, substantially as described.

2. In a lubricator, the combination with tracks, of a lubricator-casing mounted between said tracks, a lubricant-reservoir located in said casing, lubricant-conveying tubes connecting said reservoir with the rails of said tracks and protecting-tubes surrounding said conveying-tubes, a plunger-head mounted in said reservoir, a toothed plunger carried thereby, a reciprocatory casing mounted upon said plunger, an actuating-arm carried by said plunger, and extending into one of said tracks, a gripping-block carried by said casing for moving said plunger in unison therewith, a timing mechanism supported from said reservoir for controlling the movement of said plunger, means carried by said casing for actuating said timing mechanism, means located in said casing for moving said plunger rearwardly, means located within said casing for heating said conveying-tubes, and means whereby easy access may be had to said casing and reservoir.

3. In a lubricator, the combination with tracks, of a lubricating-casing mounted adjacent to said tracks, a lubricant-reservoir located in said casing, lubricant-conveying tubes connecting said reservoir with the rails of said tracks, a plunger-head mounted in said reservoir, a toothed plunger carried by said head, a reciprocatory casing mounted upon said plunger, an actuating-arm carried by said casing, and extending into one of the rails of said track, a gripping-block carried by said casing for moving said plunger, a timing mechanism for normally supporting said gripping-block out of engagement with said plunger and releasing said block at a predetermined time, means carried by said casing for actuating said timing mechanism, means for preventing a rear movement of said plunger, means located within said casing for moving said plunger rearwardly, means for protecting said conveyer-tubes, and means located within said casing for heating said conveyer-tubes.

4. In a lubricator, the combination with tracks, of a lubricator-casing, a lubricant-reservoir located therein, lubricant-conveying tubes connecting said reservoir with said tracks, a plunger for moving said lubricant from said reservoir into said tubes, a reciprocatory casing mounted upon said plunger, an actuating-arm carried by said casing and actuating from one of said tracks, means carried by said casing for gripping said plunger, a timing mechanism carried by said reservoir for controlling said means, means located within said casing for moving said plunger rearwardly, a braking mechanism controlling the rearward movement of said plunger, means for protecting said conveyer-tubes, and means located within said casing for heating said tubes.

5. In a lubricator, the combination with tracks, of a lubricator-casing, a lubricant-reservoir mounted therein, protected lubricant-conveying tubes connecting said reservoir with said tracks, a plunger for moving the contents of said reservoir, a reciprocatory casing mounted upon said plunger, an actuating-arm carried by said casing, and actuated from one of said tracks, means carried by said casing for gripping said plunger, a timing mechanism carried by said reservoir for controlling said means, a braking mechanism controlling the rearward movement of said plunger, and means located within said casing for moving said plunger rearwardly.

6. In a lubricator, the combination with curved tracks, of a lubricating-casing, mounted adjacent thereto, a lubricant-reservoir carried within said casing, a plurality of tubes connecting said reservoir with said tracks, a plunger for moving the lubricant of said reservoir into said tubes, means carried by said plunger and actuated from one of said tracks for moving said plunger, a timing mechanism carried by said reservoir for controlling said means, means including the first-named means for actuating said timing mechanism, means for moving said plunger rearwardly, a brake mechanism controlling the rearward movement of said plunger, and means for protecting said conveyer-tubes.

7. In a lubricator, the combination with tracks, of a lubricating-casing, a lubricant-reservoir mounted therein, a plurality of tubes connecting said reservoir with said tracks, a plunger mounted in said reservoir for moving the contents thereof into said tubes, means carried by said plunger and actuated from one of said tracks for moving said plunger, a timing mechanism actuated by said means for controlling the movement of said plunger, means to move said plunger rearwardly, means whereby easy access may be had to said casing and said lubricant-reservoir, and means for protecting said tubes.

8. A lubricator for street-railway tracks embodying a casing, a reservoir mounted therein, a plurality of tubes connecting said reservoir with the rails of said system, a plunger for moving the contents of said reservoir into said tubes, means located within said casing and actuated from one of said rails for moving said plunger, a timing mechanism actuated by said means for controlling the movement of said plunger, means to move said plunger rearwardly, and means for protecting said tubes.

9. A lubricator for street-railway tracks, comprising a casing, a lubricant-reservoir located therein, tubes connecting said reservoir with the curved rails of said track, a plunger mounted in said reservoir for moving the contents thereof into said tubes, means located within said casing and actuated from one of said curved rails for moving said plunger, a timing mechanism carried by said reservoir and actuated by said means for controlling the movement of said plunger, and means for protecting said tubes.

10. A lubricator for street-railway tracks, comprising a lubricant-reservoir, tubes connecting said reservoir with the curved rails of said tracks, a plunger mounted in said reservoir for moving the contents thereof into said tubes, means carried by said plunger and actuated from one of said curved rails for moving said plunger, a timing mechanism carried by said reservoir and actuated by said means for controlling the movement of said plunger, means to protect said reservoir, plunger, and timing mechanism, and means for protecting said tubes.

11. A lubricator for street-railway tracks, comprising a lubricant-reservoir, a plurality of tubes connecting said reservoir with the rails of said tracks, means for moving the contents of said reservoir into said tubes, a timing mechanism for controlling the first-named means, and means to protect said tubes.

12. A lubricator for street-railway tracks, comprising a lubricant-reservoir, tubes for conveying said lubricant to the rails of said tracks, means for moving the contents of said reservoir into said tubes at predetermined times, said means including a timing mechanism, and an actuating-arm operated from one of the rails of said tracks.

13. A lubricator for street-railway tracks, comprising a lubricant-reservoir, lubricant-conveying tubes connecting said reservoir with the rails of said tracks, means for forcing the contents of said reservoir into said tubes, said means including a plunger actuated from one of the rails of said tracks, and means for controlling the operation of said plunger.

14. A lubricator for street-railway tracks, comprising a lubricant-reservoir, lubricant-conveying tubes connecting said reservoir with the rails of said tracks, and means actuated by cars traveling over said tracks for forcing the contents of said reservoir through said tubes to said rails.

15. A lubricator for street-railway tracks, comprising a lubricant-reservoir, lubricant-conveying means connecting said reservoir with the rails of said tracks, and means automatically actuated by cars traveling over said tracks for delivering lubricant from the reservoir through said conveying means to the rails of said tracks.

In testimony whereof I affix my sixnature in the presence of two witnesses.

GEORGE W. BLANK.

Witnesses:
H. C. EVERT,
MAX H. SROLOVITZ.